United States Patent Office 3,188,731
Patented June 15, 1965

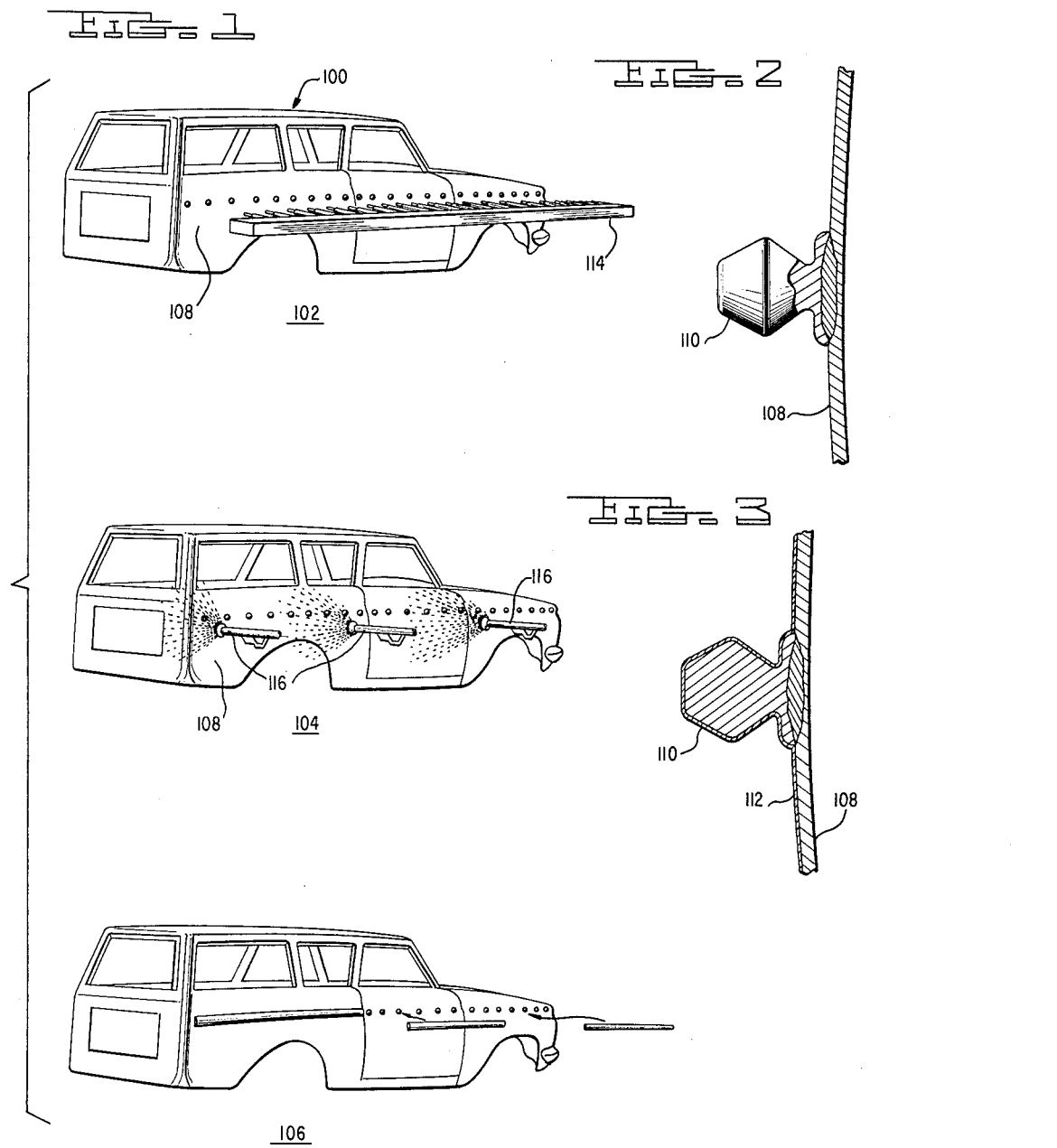

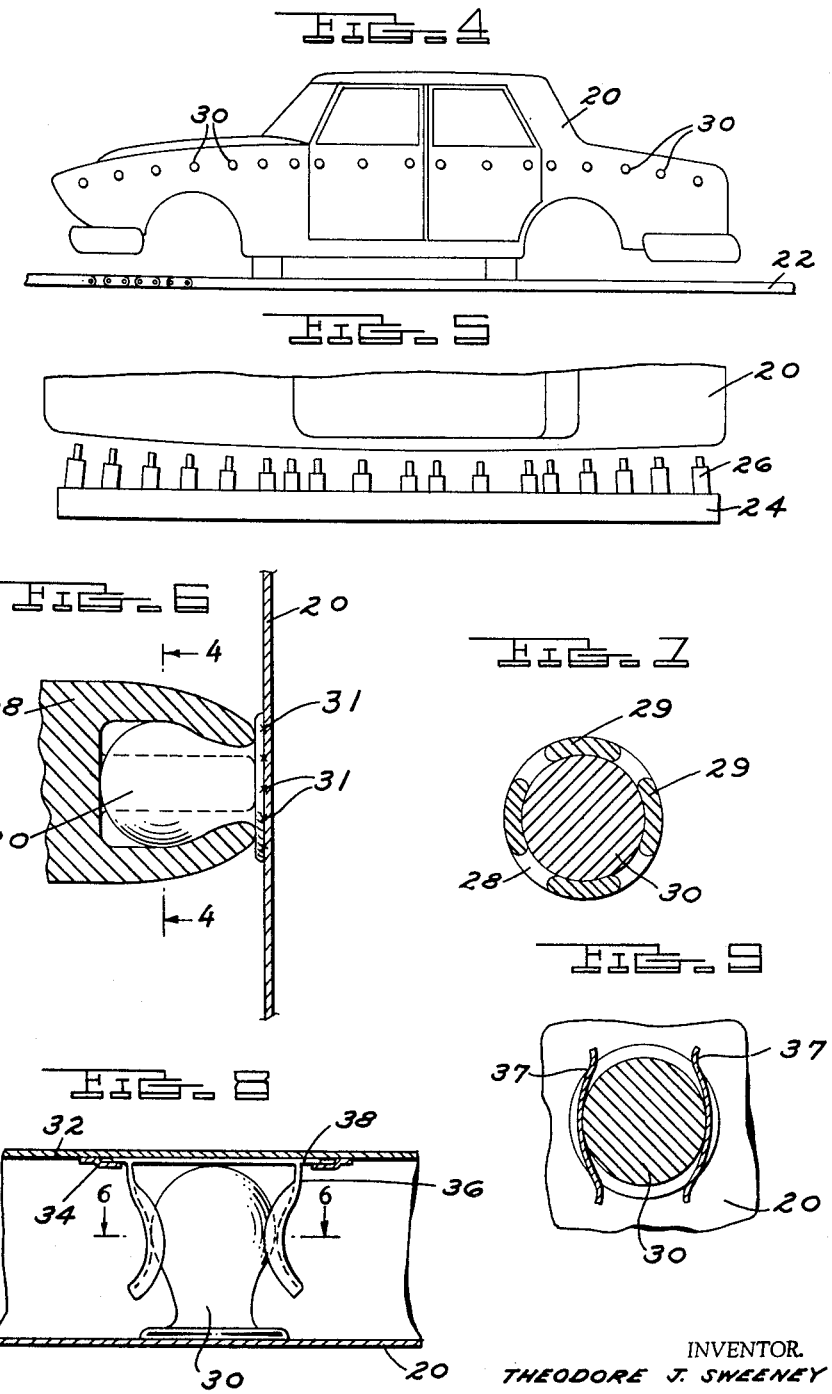

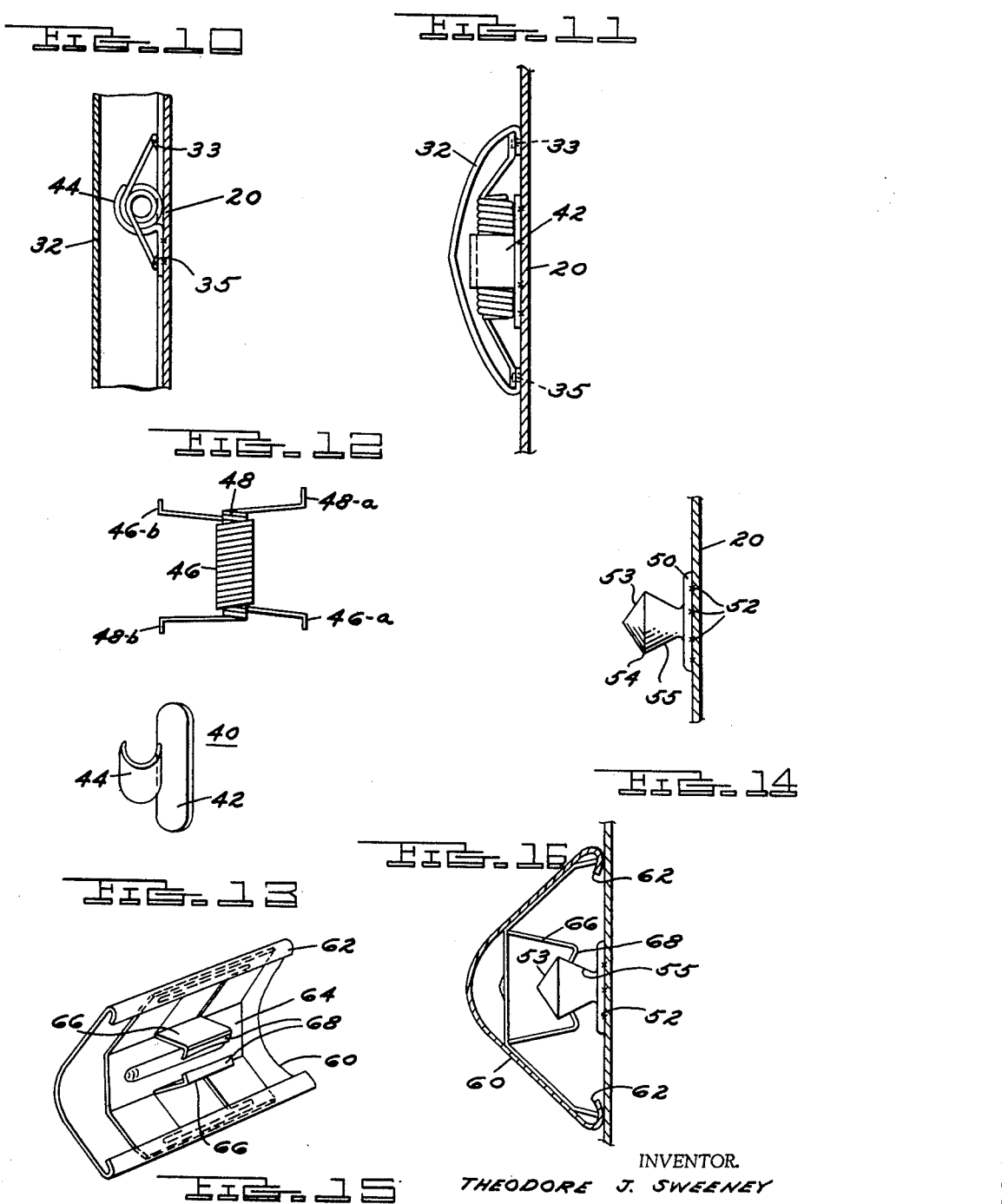

3,188,731
METHOD OF FINISHING AN AUTOMOBILE BODY INCLUDING SECUREMENT OF TRIM THERETO
Theodore J. Sweeney, Grosse Pointe, Mich., assignor to Chicago United Products Company, Inc., Detroit, Mich., a corporation of Michigan
Filed Jan. 15, 1964, Ser. No. 337,930
7 Claims. (Cl. 29—430)

This application is a continuation-in-part of my application 179,128 filed March 12, 1962 which as now issued as patent No. 3,153,468.

My invention relates to a method of assembling automobile parts wherein at least one of the parts is distorted within its elastic limit as it passes over a proturberance into an anchored position.

More particularly, my invention relates to a method of assembling a trim strip on an automobile panel wherein the trim strip is constructed with a resilient characteristic to form a trim strip resilient part and the automobile panel is equipped with a series of buttons integral therewith which form a button proturberance part. The method comprises the steps of distorting the trim strip resilient part within its elastic limit and passing it over the button proturberance part, and then permitting the resilient part to spring into a recess past the proturberance to anchor the parts, the button proturberance part being formed by uniting, preferably by welding, the base of a pea size smoothly contoured button to the surface of an automobile panel, the head of the button substantially smoothly blending with the surface of the panel but exposing completely the peripheral joint therebeneath, followed by applying at least one automobile panel finish coat of liquid material which flows around and completely conceals and seals the peripheral joint between the button shank or base and the panel, followed by other finishing steps as required.

The method of my invention departs radically from the established practice over many past years in trim application methods for automobiles.

The prior method has included the step of punching holes in an automobile panel, such as a fender, followed by the anchoring of fasteners in the holes. The sheet metal used to form the panel is around the dimensional range of 0.035 inch to 0.040 inch. The very thin edge wall of the holes through the panel does not satisfactorily draw and retain a coating of the finishing material used in finishing the automobile panel and therefore great effort and expense in recent years have been directed toward the provision of a rust inhibiting element bonded to the fasteners which acted as a water tight plug in the holes.

Prior to this plug development, an attempt to solve the problem involved the use of a sealing compound ("dumdum") placed on the fasteners by the production line assemblers before insertion of the fasteners in the hole. This "dumdum" proposal, along with others, was not satisfactory due to the difficulties of assuring proper application of the sealing material under conditions which prevail on the automobile body assembly lines. The first mentioned proposal, wherein a sealing plug was mounted on the clip by bonding thereto prior to delivery to the assembly line, overcame some of the problems of the "dumdum" process on the assembly line, but represented a substantial increase in cost. It was not unusual for the cost of equipping a fastener or spring clip with a sealing element bonded thereto to be twice as much as the cost of the basic spring clip itself.

My method eliminates the retaining hole and its vital corrosion inhibiting accessory applying and assembly steps and substitutes therefor a method which utilizes the normal finishing steps of the automobile body panels to rustproof the joint between a button integrally attached, preferably by stud welding, to the panel.

The button or proturberance has a smooth even contour and is pea size to present a smooth blending thereof with the surface of the panel. It will be rocognized that the retaining holes present a minor problem to the body finishing operation and that the pea size button is similarly minor in its effect on the finishing operation.

A button 0.120 to 0.160 inch high welded to an automobile panel 0.035 to 0.40 inch thick has been found to be most satisfactory in automobiles presently manufactured. The outer head of this button at its largest width is about 0.200 inch in diameter and its inner shank which forms an anchoring recess is about 0.080 to 0.100 inch in diameter. The trim strip completely houses the button and may be about 0.410 inch higth. Adapter means is interpositioned between the trim and the buttons to interconnect the same as will be more fully apparent hereinafter.

With respect to automobile bodies, the only difference between certain models and styles lies in the design and position of the trim. A specific door panel, for instance, may be a basic unit used in several different models; each model will have its own trim requirements. Under present practice each door is ear-marked for a specific model at the time of its formation from raw sheet metal since the holes for the trim are economically formed at this stage. The whims and fancies of the market require numerous styles (hole positions) and therefore an inventory and control problem of monumental size is created when the door panel is formed with he trim holes.

My invention alleviates this problem by enabling final decision on models and styles to be made after the formation of the basic panels, fenders, doors and the like. This decision can be postponed until after the basic panels have been assembled into a body unit since the trim buttons may easily be stud welded to the body at the body finishing line.

It will be recognized therefore that my invention allows the character and location of the trim to be determined in the final stages of automobile body manufacture, this being closer in point of time to actual sales demand and therefore considerably more responsive to the whims and fancies of the market. Warehousing, production scheduling, inventory, and all other related programs are benefited by my invention.

This invention relates to the finishing of the exterior surface of an automobile body and particularly to an automobile body the exterior surface of which is provided with decorative trim strips or pieces secured thereto.

Primarily it relates to finishing such a vehicle body including securing decorative trim pieces thereto and to accomplishing all of the finishing operations such as wet sanding, bonderizing, burnishing, painting, etc. without producing any points or sources likely to give rise to rusting, and without marring or damaging the finish coating with which the body is provided.

Heretofore, it has been common practice to provide automobile bodies with decorative trim strips or pieces of stainless steel or the like which strips or pieces were attached to the outer surface of the body wall by screws, bolts, or other attaching means. Such attaching means were commonly secured to the body wall by insertion through apertures or holes provided in the wall. Sealers to prevent leakage at such points were commonly associated with such fastening means. Such holes or apertures served as sources of rust origination, and once the rusting started it spread and gave rise to an unsightly appearing body wall and one which thereafter continued to deteriorate.

My invention is adapted to overcome this undesirable condition. It eliminates the holes through the body wall and also consequently eliminates the sealers. It is also designed to permit a complete finishing operation for an automobile body which operation may be rapidly and easily carried out and which results in a finish that is permanent and of attractive appearance and which substantially minimizes upkeep cost.

An object is the provision of an improved process whereby an automobile body is provided with a suitable outer finish coating and a decorative trim strip is secured thereto without perforating the body wall panel, without marring the coating, and in fastening the strip to the body in such a manner as to securely hold the trim strip in place thereon.

Another object is the provision of an improved process of the character hereinabove set forth which process embodies the complete finishing of the metal wall of the automobile body prior to the securement of the decorative trim pieces thereto, and to thereafter securing the decorative trim pieces to such metal wall without perforating, marring or disfiguring the finished wall.

A meritorious feature is the provision of a process as hereinabove outlined which includes the employment of cooperative fastener elements to secure decorative trim pieces to the exterior surface of automobile metal panels and particularly exterior body wall panels, and to accomplish such result without perforating the panels and without marring the finished surface of the panels.

More particularly, the method hereinafter set forth comprises the employment of cooperative fastener elements to secure trim strips or pieces to the body wall, and wherein one fastener element is securely fixed to the sheet metal wall panel of an automobile body prior to applying the finish coating to such panel, and the surface of the panel to which said fastener element is attached is thereafter subjected to its complete finish coating treatment prior to the securement of the decorative trim strip thereto.

Preferably, cooperating male and female fastener elements are employed and the male fastener element is preferably secured to the exterior surface of the body wall and the cooperating female fastener is secured to the trim strip. The male fastener element is relatively small and of smooth even contour which blends with the surface of the panel to which it is secured so such panel may be properly and completely finished without the fastener element unduly interfering with the carrying out of the finishing operations.

Another meritorious feature is that in the construction herein set forth the male fastener element is fixedly secured to the body and the female fastener element or adapter is shiftably secured to the trim piece whereby slight discrepancies in accurate positioning will be accommodated for by shiftable positioning of the female fastener element.

Further, decorative trim strips may be applied over portions of the body walls such as the roofs of closed bodies or the decks of trunk compartments, where trim strips are not currently being used, because of danger of leakage.

Other objects, advantages and meritorious features will more fully appear from the following specification, claims, and accompanying drawings, wherein:

FIG. 1 is a schematic view showing the method of the invention;

FIG. 2 is a side view partly in section showing the button stud welded to the automobile panel;

FIG. 3 is a side view similar to FIG. 2 showing the sealed condition of the welded joint;

FIG. 4 is a side elevation of a conventional automobile body mounted upon a conveyor to be carried along for finishing, the fastening elements 30 being shown on an enlarged scale for clarity;

FIG. 5 is a schematic section of such body associated with electric welding means adapted to secure fastener elements to the body;

FIG. 6 is an enlarged sectional view through a fragment of the fastener retaining portion of an electric welder showing a fastener element supported thereby;

FIG. 7 is a sectional view taken on the line 4—4 of FIG. 6;

FIG. 8 is a schematic sectional view through a trim strip showing a fastener element supported by the trim strip being inserted over the cooperating fastener element secured to the vehicle body;

FIG. 9 is a sectional view taken on the line 6—6 of FIG. 8;

FIG. 10 is a sectional view through a fragment of a trim strip provided with a modified form of spring fastener element engaged with a cooperating fastener element secured to the body wall;

FIG. 11 is a cross sectional view through the modified construction shown in FIG. 10 taken at a right angle thereto;

FIG. 12 is a plan of that portion of the fastener combination shown in FIGS. 10 and 11 which is carried by the trim strip;

FIG. 13 is a perspective of that portion of the fastener combination shown in FIGS. 10 and 11 which is carried by the body;

FIG. 14 is a side elevation of a modified male fastener element secured to a fragment of a body panel which male fastener element bears a general resemblance to the fastener element shown in FIGS. 6 through 9, but represents an improved form thereof;

FIG. 15 illustrates a female fastener carried by a trim strip which female fastener is cooperable with the fastener of FIG. 14; and FIG. 16 is a cross sectional view showing interengagement of the elements of FIGS. 14 and 15.

This invention relates to the finishing of motor vehicle bodies where the bodies are provided, as is common current practice, with decorative trim strips or pieces attached to the exterior thereof. Such decorative strips are generally attached by means of screws, bolts, or the like which extend through holes in the body wall. These holes form sources of rust production and such rust grows. Rust streaks form and extend away from the hole over the wall and impair the appearance of the body.

The instant invention has to do with the finishing of an automobile body which includes the securement of fastener elements thereto during the finishing operation and without piercing or perforating the wall of the body and which elements are adapted to be cooperatively connected with other fastener elements carried by a decorative trim strip whereby the trim strip may be attached to the body following the application of the finish coat to the body and without any modification or alteration of the body and without damage to the finish coat.

In the carrying out of the process of this invention, different types of fastener elements may be employed. Three different combinations of fasteners are shown in the application as typical of those that might be used. It is a feature of this invention that one of the fastener elements of the fastener combination is fixedly secured to the body at the beginning of the body finishing operation. The finishing operation is then carried out following the securement of this fastener element to the body. The fastener element which is secured to the body is preferably of a character which does not interfere with the carrying out of the finishing operations including application of the finish coat to the body. The cooperating fastener element or discrete adapter is secured to the decorative trim part or the like that is to be attached to the exterior of the body. Following the completion of the application of the finish coat to the body, the trim part is then secured thereto through interengagement of the cooperating fastener elements.

In FIG. 4 the automobile body is indicated as 20; it is shown as supported upon a conventional conveyor mechanism 22. In FIG. 5 there is schematically illustrated a gang electric welding mechanism 24 provided with individual welding contact fixtures 26. Such are of conventional construction and specifically form no part of the invention. In FIG. 6 the fastener supporting socket or carrier is indicated at 28. A fastener element 30 is illustrated as supported therein. The socket portion 28 is shown as embodying a plurality of fingers 29. These are more clearly illustrated in FIG. 7. These are resilient fingers adapted to support the fastener element 30 as shown in FIGS. 7 and 8.

This fastener element 30 is the male fastener element of cooperating male and female fastener elements. This male fastener element is shown as having a head portion and a base portion 31. The base portion 31 is adapted to be welded to the body wall 20 as indicated at 25 in FIG. 6.

The female fastener element 36 is illustrated in FIGS. 8 and 9 and is shown in FIG. 8 as being carried by the trim strip 32 which strip is somewhat channel shaped in cross section as shown in FIGS. 8 and 11. The female fastener element itself is indicated in FIG. 8 as being a two part structure. One part is a bracket portion 34 welded or otherwise secured to the interior of the trim strip 32. The gripping portion of this female fastener structure is indicated as 37 and has a base plate portion 38, which base plate portion is received and carried by the bracket portion 34 as shown in FIG. 8. This base plate portion is so held by the bracket part of the fastener as to have relative shiftable adjustment thereunderneath linearly with respect to the trim strip as illustrated in FIGS. 8 and 9. Clearance is shown in FIG. 8 between the ends of the base plate 38 and the ends of the bracket 34. Such adjustment is in order that variations in positioning of the male fastener element upon the body may be accommodated for by accommodation of adjustment of the gripping fingers 37 of the female fastener element 36.

As shown in FIGS. 8 and 9, the head portions of the male fastener element 30 is cooperatively gripped by the fingers 37 of the gripping portion of the female fastener element 36 so that a trim strip provided with such female fasteners may be quickly attached to the male fastener elements that are secured to the body wall.

While the male fastener elements 30 have been described as welded to the body wall, such may be secured thereto by suitable adhesives. Adhesive securement such as provided by Chrysler's "cycleweld," or well known epoxy resin adhesives such as are put out by "Minnesota Mining" or "Dow Chemical" might be used. What is necessary is that the securement be of such a character as not to damage or impair the body wall or produce points at which rust would originate to cause deterioration of the body wall. It is also necessary that the fastener element which is secured to the body wall be of such character that the finishing of the body may be carried out thereover following the securement of the fastener elements thereto.

In the finishing operation as carried out on an automobile body several steps are involved. The surface of the metal is cleaned and while the metal is in the unfinished state, the fastener elements 30 are secured thereto. They may be welded thereto as hereinabove stated. The complete finishing of the body is then accomplished. It is bonderized or otherwise suitably treated to inhibit rust. The different primer and paint coats are applied to it; alternating with the paint coats the body is burnished or polished with suitable burnishing brushes or wheels. The male fastener element 30 is of such a character, being of smooth contour and lying close to the body and presenting no parts that would unduly interfere with either the cleaning, burnishing or painting operations, so that such are all carried out over the fastener and the resulting automobile body with the male fastener elements attached presenting no openings or points which might be productive of corrosion. The paint coat seals the base of the fastener against the body wall and against the entry of moisture between the fastener and the body wall.

In FIGS. 10 through 13, a somewhat different type of interlocking fastener construction is illustrated. In these figures the body wall is also indicated as 20 and the trim strip as 32. The fastener element which is shown as secured to the body wall is indicated as 40 in FIG. 13. It comprises a base portion 42 and a hook portion 44. This base portion 42 may be welded or otherwise securely fixed to the body 20 as shown in FIG. 11. The hook portion projects normally with respect to the base portion away from the body. The trim strip is provided with a cooperating fastener portion 47.

This cooperating fastener portion is shown in FIG. 12. It consists of two telescopically assembled spiral spring parts 46 and 48. The ends of the outer spring coils of the spring 46 are indicated as 46a and 46b. The ends of the spring coils of the inner spring 48 are indicated as 48a and 48b. These ends of the springs indicated as 46a, 46b and 48a and 48b constitute a base part. The trim strip itself is shown as having marginal flange portions 33 and 35 at the opposite walls of its channel shape. These flange portions are bent inwardly overhanging the inner surface of the trim strip as appears in FIG. 11. This spring fastener element is adjustable linearly of the trim strip by slidable adjustment of the spring ends underneath the flanges.

To assemble the spring fastener structure shown in FIG. 12 upon the trim strip, the ends are tensioned and inserted underneath the flanges 33 and 35 as shown in FIG. 11. The helical portion of the spring assembly 47 may then be received underneath the hook part 44 of the fastener element that is secured to the body as shown in FIG. 11.

In FIG. 14, there is shown a male fastener element generally similar to that shown in FIGS. 6 and 8, except that the head and shank portion thereof is somewhat differently shaped. In FIG. 14, the base of the fastener element is indicated as 50. It is spot welded as at points 52 to the metal body. The head of the fastener is indicated as 54. It is somewhat differently shaped from the head of the fastener 30 in that it is designed to be more easily received into the socket of a cooperating female fastener. Moreover the shank and the under portion of the head is so sloped as shown in FIG. 14 as to cause the interlocking male and female fastener elements to tension the decorative trim strip toward the automobile body. The head 54 of this male mastener is provided with a conical dome shaped crown 53 which is of a smooth contour and so shaped as to enter easily between opposed spring fingers of a female fastener element carried by the trim strip 60 as shown in FIGS. 15 and 16. The shank 55 of the male fastener element and the underside of the head is conical in cross section and flares gradually and smoothly away from the base 50 of the fastener toward the head 54.

In FIGS. 15 and 16, the trim strip 60 is shown as having inturned side flanges 62 and the female socket like fastener 64 has a base the opposite ends of which are shown as received underneath and between the side flanges 62 of the trim strip as shown in FIGS. 15 and 16. The opposite ends of the base of this fastener element are snugly received underneath these inturned marginal flanges of the strip and slidably thereunder linearly of the strip to adjusted positions. Such adjustment facilitates engagement between the male and female fastener elements. The female fastener frictionally and resiliently maintains its adjusted position underneath the flanges of the strip.

When the head 54 of the male fastener is received between the inturned ends 68 of the fingers 66 of the female fastener, the tension exerted by the female fastener upon the underside of the head and the shank of the male fastener tends to draw the trim strip toward the body as will be apparent from the view in FIG. 16. This is due to the flare of the shank 55 of the male fastener and the resilient engagement of the inturned fingers of the female fastener. The smooth contour of the head and shank of the male fastener is such that in any of the finishing operations performed on the body side wall such as buffing the same with burnishing wheels or the like, these finishing devices will pass freely over the male fastener without being caught thereby.

Referring now to FIGURES 1-3, it will be noted that the steps of the method are somewhat schematically shown with an automobile body unit 100 progressively positioned at each of three finishing or work stations 102, 104, 106 of an automobile body assembly line. FIGURE 2 shows the condition of the automobile panel 108 after welding a button 110 thereto, it being apparent this fastener element or button 110 has contour characteristics smoothly blending with the panel surface of the body unit, a characteristic of all fastener elements previously described.

FIGURE 3 shows the condition of the automobile panel 108 and button 110 after the finishing step whereby a film 112 of paint or the like is applied and dried to provide a continuous film 112 which seals the continuous peripheral joint between the panel surface and the button against corrosion.

It will therefore be understood that an automobile body unit may be moved to the work station 102 where buttons 110 are welded thereto, as by stud welding by the gang welding equipment 114 shown, a series of buttons being shown welded at predetermined locations.

After welding, the body unit 100 is moved to the work station 104 where a portion of the normal finishing operation is depicted by spray guns 116 which provide the rust inhibiting film 112 shown in FIGURE 3.

After finishing the body unit 100 is moved to work station 106 where the trim part connecting step of the process is accomplished.

It is to be understood that the body unit 100 may be subject to pickling and/or bonderizing operations and be in-the-white (unpainted) before as well as after the welding of the buttons thereto. Also it is to be understood that the buffing and sanding operations previously discussed may take place after the buttons 110 have been welded to the body panels, these operations being made possible by the smooth contour characteristics of the fastener elements or buttons.

The small fastener elements or buttons specifically described herein all may be characterized as being BB-shot size, pea size, pearl size or the like, each having contour characteristics smoothly blending with the surface of the body unit or automobile panel.

I claim:
1. The method of finishing a metal automobile body panel including the painting thereof and attachment thereto of trim comprising: moving the body panel through successive finishing stations, at one station welding to the body panel while in an unfinished state a plurality of metal buttons of BB-shot size and smooth uniform shape with contour characteristics smoothly blending with the surface of the body panel at predetermined locations coordinated with the predetermined desired position of the trim, accomplishing said welding at the surface of the body panel and throughout the entire extent of contact of the buttons with the body panel and without perforation of the body panel and producing a completely exposed continuous peripheral joint between each of the buttons and the surface of the body panel, at a subsequent finishing station painting the panel, said painting including the application to the body panel and to the buttons of at least one paint coat providing a continuous paint film which seals the continuous peripheral joints between each of the buttons and the body panel against corrosion, and after drying the paint and at a further subsequent finishing station bringing the trim into ordered association with the buttons and resiliently connecting the trim to the buttons in overlying substantially completely housing and concealing relationship thereto.

2. The method as defined in claim 1 characterized in that prior to connecting the trim to the buttons, resilient adapter means are secured within the trim to provide a trim assembly, and said trim assembly is brought into ordered association with the button and the adapter means is resiliently connected to the buttons to connect the trim thereto in overlying substantially completely housing and concealing relationship on the buttons.

3. The method defined in claim 2 characterized in that said adapter means comprises a plurality of discrete adapters, and such adapters are positioned in the trim at locations corresponding to the location of the buttons.

4. The invention as defined in claim 1 characterized in that the buttons are electrically welded to the body panel.

5. The invention as defined in claim 1 characterized in that at the time the buttons are welded to the body panel it is in-the-white.

6. The invention as defined in claim 1 characterized in that the welding step involves electric welding of the buttons to the body panel in-the-white, and then prior to the painting step the body panel is sanded and buffed.

7. The method as defined in claim 1 characterized in that the step of connecting the trim to the buttons includes the interpositioning of an adapter means between the trim and the buttons to interconnect the same.

References Cited by the Examiner

UNITED STATES PATENTS

| | | | |
|---|---|---|---|
| 1,238,206 | 8/17 | Shuler | 219—107 X |
| 1,449,829 | 3/23 | Miller | 29—460 X |
| 1,908,226 | 5/33 | De Long | 29—460 |
| 1,960,042 | 5/34 | Andrus | 219—107 X |
| 2,112,178 | 3/38 | Selph. | |
| 2,517,411 | 8/50 | Patterson. | |
| 2,757,447 | 8/56 | Barenyi | 29—430 |
| 2,779,092 | 1/57 | Gordon | 29—430 |

WHITMORE A. WILTZ, *Primary Examiner.*